(12) United States Patent
Muraki et al.

(10) Patent No.: US 10,707,454 B2
(45) Date of Patent: Jul. 7, 2020

(54) PACKAGING MATERIAL FOR POWER STORAGE DEVICE AND POWER STORAGE DEVICE USING THE SAME

(71) Applicant: TOPPAN PRINTING CO., LTD., Tokyo (JP)

(72) Inventors: Takuya Muraki, Tokyo (JP); Shunsuke Nakanishi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 216 days.

(21) Appl. No.: 15/950,420

(22) Filed: Apr. 11, 2018

(65) Prior Publication Data

US 2018/0233709 A1    Aug. 16, 2018

Related U.S. Application Data

(63) Continuation of application No. PCT/JP2016/080401, filed on Oct. 13, 2016.

(30) Foreign Application Priority Data

Oct. 15, 2015  (JP) .................................. 2015-203489
Jan. 14, 2016  (JP) ................................. 2016-005250

(51) Int. Cl.
*H01M 2/00* (2006.01)
*H01M 2/02* (2006.01)
(Continued)

(52) U.S. Cl.
CPC ............... *H01M 2/024* (2013.01); *B32B 1/02* (2013.01); *B32B 3/04* (2013.01); *B32B 7/12* (2013.01);
(Continued)

(58) Field of Classification Search
CPC ............. H01M 2/024; H01M 2220/20; H01M 2/0275; H01M 2/02; H01M 2/0262;
(Continued)

(56) References Cited

U.S. PATENT DOCUMENTS 7,285,334 B1 * 10/2007 Yamashita .......... H01M 2/0267
428/220
2012/0135301 A1 * 5/2012 Akita .................. H01M 2/0212
429/185

(Continued)

FOREIGN PATENT DOCUMENTS

JP    2012-216509 A    11/2012
JP    2013-101765 A    5/2013
(Continued)

OTHER PUBLICATIONS

International Search Report with English translation and Written Opinion issued in International Application No. PCT/JP2016/080401 dated Dec. 20, 2016.
(Continued)

*Primary Examiner* — Nicholas P D'Aniello
(74) *Attorney, Agent, or Firm* — Foley & Lardner LLP (57) ABSTRACT

A packaging material for a power storage device includes a structure made up of a cover layer, a barrier layer, a sealant adhesive layer, and a sealant layer laminated in this general order. In the packaging material, the barrier layer has an aluminum foil layer and an anticorrosion treatment layer that is provided to a sealant layer side surface of the aluminum foil layer and faces the sealant adhesive layer. The sealant layer side surface of the aluminum foil layer has a 60° glossiness that is 690 or less in both MD and TD, and has a difference in 60° glossiness between MD and TD that is 100 or less.

10 Claims, 3 Drawing Sheets

(51) Int. Cl.
| | |
|---|---|
| *B32B 15/08* | (2006.01) |
| *H01G 11/78* | (2013.01) |
| *B32B 15/20* | (2006.01) |
| *B32B 27/08* | (2006.01) |
| *B32B 15/085* | (2006.01) |
| *B32B 27/32* | (2006.01) |
| *B32B 15/095* | (2006.01) |
| *B32B 7/12* | (2006.01) |
| *B32B 27/18* | (2006.01) |
| *B32B 27/16* | (2006.01) |
| *B32B 27/26* | (2006.01) |
| *B32B 27/40* | (2006.01) |
| *B32B 1/02* | (2006.01) |
| *B32B 3/04* | (2006.01) |
| *B32B 27/34* | (2006.01) |
| *H01G 11/80* | (2013.01) |
| *H01M 2/08* | (2006.01) |

(52) U.S. Cl.
CPC ............ *B32B 15/08* (2013.01); *B32B 15/085* (2013.01); *B32B 15/095* (2013.01); *B32B 15/20* (2013.01); *B32B 27/08* (2013.01); *B32B 27/16* (2013.01); *B32B 27/18* (2013.01); *B32B 27/26* (2013.01); *B32B 27/322* (2013.01); *B32B 27/34* (2013.01); *B32B 27/40* (2013.01); *H01G 11/78* (2013.01); *H01G 11/80* (2013.01); *H01M 2/02* (2013.01); *H01M 2/0262* (2013.01); *H01M 2/0287* (2013.01); *H01M 2/08* (2013.01); *B32B 2250/05* (2013.01); *B32B 2250/40* (2013.01); *B32B 2255/06* (2013.01); *B32B 2255/20* (2013.01); *B32B 2255/26* (2013.01); *B32B 2264/0221* (2013.01); *B32B 2270/00* (2013.01); *B32B 2307/306* (2013.01); *B32B 2307/31* (2013.01); *B32B 2307/406* (2013.01); *B32B 2307/518* (2013.01); *B32B 2307/538* (2013.01); *B32B 2307/714* (2013.01); *B32B 2307/718* (2013.01); *B32B 2307/7265* (2013.01); *B32B 2307/732* (2013.01); *B32B 2439/40* (2013.01); *B32B 2457/00* (2013.01); *H01M 2220/20* (2013.01); *Y02E 60/13* (2013.01)

(58) Field of Classification Search
CPC ...... H01M 2/0287; H01M 2/08; H01G 11/78; H01G 11/80; B32B 2307/714; B32B 2307/538; B32B 7/02; B32B 15/08; B32B 15/20; B32B 27/08; B32B 15/085; B32B 27/322; B32B 15/095; B32B 7/12; B32B 27/18; B32B 27/16; B32B 27/26; B32B 27/40; B32B 1/02; B32B 3/04; B32B 27/34; B32B 2307/732; B32B 2270/00; B32B 2255/26; B32B 2255/20; B32B 2307/406; B32B 2457/00; B32B 2307/306; B32B 2307/518; B32B 2250/40; B32B 2307/718; B32B 2307/7265; B32B 2307/31; B32B 2439/40; B32B 2264/0221; B32B 2250/05; B32B 2255/06; B32B 2457/16; Y02E 60/13

See application file for complete search history.

(56) References Cited

U.S. PATENT DOCUMENTS

| 2014/0272466 A1 | 9/2014 | Wright et al. |
| 2017/0018744 A1 | 1/2017 | Ogihara et al. |

FOREIGN PATENT DOCUMENTS

| JP | 2014-065956 A | 4/2014 |
| WO | WO-2015/152397 A1 | 10/2015 |

OTHER PUBLICATIONS

Notification of Reasons for Rejection dated Jan. 7, 2020 for corresponding Japanese Application No. 2016-005250.

\* cited by examiner

PACKAGING MATERIAL FOR POWER STORAGE DEVICE AND POWER STORAGE DEVICE USING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/080401, filed on Oct. 13, 2016, which is based upon and claims the benefit of priority of Japanese Patent Application No. 2015-203489, filed on Oct. 15, 2015 and Japanese Patent Application No. 2016-005250, filed on Jan. 14, 2016, the entireties of which are all hereby incorporated by reference.

TECHNICAL FIELD

The present invention relates to a packaging material for a power storage device and a power storage device using the same.

BACKGROUND ART

Power storage devices are known to include secondary batteries, such as lithium ion batteries, nickel hydride batteries, and lead batteries, and electrochemical capacitors, such as electric double layer capacitors. Due to miniaturization of mobile devices, limitation of installation spaces, or the like, further miniaturization of power storage devices is sought, and thus recently attention is given to lithium ion batteries for their high energy density. Packaging materials for lithium ion batteries have conventionally been metal cans, however; multilayer films are increasingly used because they are lightweight, highly heat dissipating, and produced at low cost.

Such a lithium ion battery using a multilayer film as a packaging material uses a configuration in which battery contents (e.g., cathode, separator, anode, electrolyte solution) are covered with a packaging material including an aluminum foil layer to thereby prevent moisture from penetrating into the battery. A lithium ion battery using such a configuration is referred to as an aluminum laminated lithium ion battery.

Embossed lithium ion batteries, for example, are known as aluminum laminated lithium ion batteries. In such an embossed lithium ion battery, a recessed portion is formed at part of the packaging material by cold forming, battery contents are stored in the recessed portion, and the rest of the packaging material is folded back, followed by heat sealing the edge portions (e.g., see PTL 1). With such a lithium ion battery, a recess formed deeper by cold forming enables storage of more battery contents to achieve higher energy density.

CITATION LIST

Patent Literature

[PTL 1] JP 2013-101765 A

SUMMARY OF THE INVENTION

Technical Problem

Power storage devices, when applied to cars, motorcycles, or the like requiring high reliability, are subjected to a severe test that is a compression test of pressing the battery cells. In this case, in spite of being evaluated as having abilities that are no different from other packaging materials in terms of some evaluation matters, some packaging materials may be found to be different from others as a result of the compression test.

It is thus an object of the present invention to provide a packaging material for a power storage device exhibiting good results in a battery-cell compression test, and a power storage device using the same.

Solution to Problem

The present invention provides a packaging material for a power storage device, including a structure made up a cover layer, a barrier layer, a sealant adhesive layer, and a sealant layer laminated in this general order. In the packaging material, the barrier layer includes an aluminum foil layer and an anticorrosion treatment layer that is provided to a sealant-layer-side surface of the aluminum foil layer and faces the sealant adhesive layer; the sealant-layer-side surface of the aluminum foil layer has a 60° glossiness that is 690 or less in both MD and TD; and the sealant-layer-side surface of the aluminum foil layer has a difference in 60° glossiness between MD and TD that is 100 or less.

According to the findings from an investigation conducted by the present inventor, when a battery cell ruptures in the compression test, the barrier layer and the sealant adhesive layer are apt to separate from each other at the interface therebetween, and the difference in glossiness of the aluminum foil layer of the barrier layer can change the adhesiveness of the sealant adhesive layer. The glossiness of the aluminum foil layer is considered to be affected by the surface roughness of the aluminum foil layer. Different surface roughness leads to different strength of anchor effect accordingly, which is assumed to be the cause of change in adhesiveness of the sealant adhesive layer. When the glossiness of the sealant-layer-side aluminum foil layer facing the sealant adhesive layer and the difference in glossiness satisfy the above numerical ranges, the surface roughness of the aluminum foil layer also affects the surface of the anticorrosion treatment layer, and the battery cell produced from the packaging material for a power storage device of the present invention shows good results in compression test.

The sealant-layer-side surface of the aluminum foil layer may have a 60° glossiness that is 150 or less in both MD and TD, and may have a difference in 60° glossiness between MD and TD that is 50 or less. In this case as well, advantageous effects of the present invention are sufficiently exhibited.

In addition, the present invention provides a packaging material for a power storage device, including a structure made up a cover layer, a barrier layer, a sealant adhesive layer, and a sealant layer laminated in this general order, meaning that other layers may be provided but that these layers must be present and in this relationship to each other. In the packaging material, the barrier layer includes an aluminum foil layer and an anticorrosion treatment layer that is provided to a sealant-layer-side surface of the aluminum foil layer and faces the sealant adhesive layer; the aluminum foil layer in a state of being provided with the anticorrosion treatment layer has a 60° glossiness that is 590 or less in both MD and TD; and the aluminum foil layer in a state of being provided with the anticorrosion treatment layer has a difference in 60° glossiness between MD and TD that is 100 or less.

According to the findings from an investigation conducted by the present inventor, when a battery cell ruptures in the compression test, the barrier layer and the sealant adhesive layer are apt to separate from each other at the interface therebetween, and the difference in glossiness of the aluminum foil layer provided with the anticorrosion treatment layer in the barrier layer can change the adhesiveness of the sealant adhesive layer. The glossiness of the aluminum foil layer in a state of being provided with the anticorrosion treatment layer is considered to be affected by the surface roughness of the aluminum foil layer. Different surface roughness leads to different strength of anchor effect accordingly, which is assumed to be the cause of change in adhesiveness of the sealant adhesive layer. When the glossiness of the aluminum foil layer provided with the anticorrosion treatment layer facing the sealant adhesive layer and the difference in glossiness satisfy the above numerical ranges, the battery cell produced from the packaging material for a power storage device of the present invention shows good results in a compression test.

The aluminum foil layer provided with the anticorrosion treatment layer may have a 60° glossiness that is 120 or less in both MD and TD, and may have a difference in 60° glossiness between MD and TD that is 40 or less. In this case as well, advantageous effects of the present invention are sufficiently exhibited.

The present invention provides a power storage device, including: battery elements including electrodes; leads extending from the respective electrodes; and a container holding the battery elements. In the device, the container is formed from any one of the packaging materials for a power storage device set forth above, so that the sealant layer is located on the inward side. The power storage device shows good results in compression test of the battery cell.

The present invention provides a packaging material for a power storage device, including a laminate made up of at least one substrate layer, an adhesive layer, an aluminum foil layer provided with an anticorrosion treatment layer on at least one surface, a sealant adhesive layer, and a sealant layer laminated in this order. In the packaging material, the aluminum foil layer has a sealant-layer-side surface with a surface roughness in a range of 4.6 μm or more to 10.0 μm or less in terms of arithmetic mean height Sa.

The present invention provides a power storage device, including: battery elements including electrodes; 1 leads extending from the respective electrodes; and a container holding the battery elements. In the device, the container is formed from the packaging material for a power storage device set forth above, so that the sealant layer is located on the inward side.

Advantageous Effects of the Invention

The present invention can provide a packaging material for a power storage device exhibiting good results in a battery-cell compression test and a power storage device using the same.

DESCRIPTION OF REPRESENTATIVE EMBODIMENTS

With reference to the drawings, preferred embodiments of the present invention will be described in detail. In the drawings, the same or corresponding parts are denoted by the same reference signs to omit duplicate description. It is to be understood that the present invention is not limited to the following description of embodiments. The following embodiments are intended to be representative of the present invention.

[Packaging Material for Power Storage Device]

Figure 1:
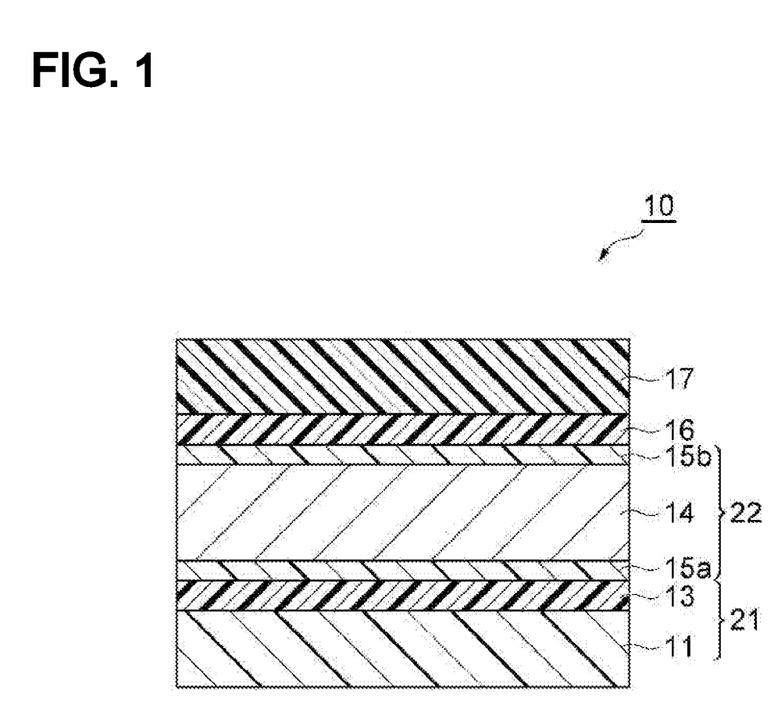
FIG. 1 is a schematic cross-sectional view illustrating a power storage device packaging material, according to an embodiment of the present invention.

FIG. 1 is a schematic cross-sectional view illustrating an embodiment of a packaging material for a power storage device of the present invention. As shown in FIG. 1, a packaging material (packaging material for power storage device) 10 of the present embodiment is a laminate including a cover layer 21, a barrier layer 22 provided to a surface side of the cover layer 21, a sealant adhesive layer 16 provided to the barrier layer 22 on a side opposite of the cover layer 21, and a sealant layer 17 provided to the sealant adhesive layer 16 on a side opposite of the barrier layer 22, which are laminated in this order or general order in relationship to each other.

The cover layer 21 includes a substrate layer 11 and an adhesive layer 13, with the adhesive layer 13 facing the barrier layer 22. The barrier layer 22 includes an aluminum foil layer 14 and anticorrosion treatment layers 15a and 15b provided to opposing surfaces of the aluminum foil layer 14. The anticorrosion treatment layers 15a and 15b are provided facing the adhesive layer 13 and the sealant adhesive layer 16, respectively. The term "facing" means that surfaces are directly in contact with each other.

In the packaging material 10, the substrate layer 11 is the outermost layer and the sealant layer 17 is the innermost layer. That is, the packaging material 10 is used, with the substrate layer 11 being on the outside of the power storage device and the sealant layer 17 being on the inside of the power storage device. The respective layers will be described below.

(Substrate Layer 11)

The substrate layer 11 imparts heat resistance and electrolyte resistance to the packaging material 10 to suppress possible occurrence of pinholes therein during processing or distribution. The heat resistance is effective in the pressure heat-sealing step, described later, performed during production of the power storage device. The electrolyte resistance is effective against electrolyte leakage from other power storage devices. The substrate layer 11 is made of a polyamide film.

The substrate layer 11 may preferably be made of a biaxially stretched polyamide film, from the perspective of obtaining better deep drawing formability.

The polyamide resins used for the biaxially stretched polyamide film include, for example, nylon 6, nylon 6,6, a copolymer of nylon 6 and nylon 6,6, nylon 6,10, polymetaxylylene adipamide (MXD6), nylon 11, and nylon 12.ke. Of these, nylon 6 (ONy) is preferred from the perspective of having good heat resistance, piercing strength and impact strength.

Examples of a stretching method for the biaxially stretched film include sequential biaxial stretching, tubular biaxial stretching, and simultaneous biaxial stretching. From the perspective of obtaining better deep drawing formability, the biaxially stretched film is preferably stretched using tubular biaxial stretching method.

The substrate layer 11 preferably has a thickness in the range of 6 to 40 μm and more preferably 10 to 30 μm. When the substrate layer 11 has a thickness of 6 μm or more, pinhole resistance and insulating properties are likely to be improved in the packaging material 10 for a power storage device. If the substrate layer 11 has a thickness of more than 40 μm, the total thickness of the packaging material 10 for a power storage device is increased and the battery electrical capacity may have to be reduced.

(Adhesive Layer 13)

The adhesive layer 13 adheres the substrate layer 11 to the barrier layer 22. The adhesive layer 13 has an adhesive force needed to firmly adhere the substrate layer 11 to the barrier layer 22 and also has conformability (ability to reliably form the adhesive layer 13 on a member without separation, even when the member is deformed, stretched or contracted) to prevent breaking of the barrier layer 22 by the substrate layer 11 during cold forming.

As an adhesive constituting the adhesive layer 13, there can be used a two-part curing type polyurethane adhesive comprising, for example, a main resin made of a polyol such as a polyester polyol, a polyether polyol, an acrylic polyol or the like, and a curing agent such as an aromatic or aliphatic isocyanate. In this adhesive, the molar ratio (=NCO/OH) of the isocyanate groups of the curing agent to the hydroxyl groups of the main resin is preferably in the range of 1 to 10, and more preferably 2 to 5.

After being applied, the polyurethane adhesive is aged at 40° C. for 4 days or longer, for example. The aging advances the reaction of the hydroxyl group of the base resin with the isocyanate group of the curing agent, allowing more firm adhesion of the substrate layer 11 to the barrier layer 22.

From the perspective of obtaining desired adhesive strength, conformability, processability, and the like, the thickness of the adhesive layer 13 is preferably in the range of 1 to 10 μm, and more preferably 2 to 6 μm.

(Aluminum Foil Layer 14)

An aluminum foil layer 14 is superior as the metal foil, from the perspective of processability, such as moisture resistance, ductility and malleability, and costs. The aluminum foil may be generally used soft aluminum foil, but aluminum foil containing iron is preferred for having good pinhole resistance, ductility and malleability.

The aluminum foil containing iron (100 mass %) preferably has an iron content in the range of 0.1 to 9.0 mass % and more preferably 0.5 to 2.0 mass %. The iron content of 0.1 mass % or more may lead to obtaining a packaging material 10 having better pinhole resistance, and ductility and malleability. The iron content of 9.0 mass % or less may lead to obtaining a packaging material 10 with better flexibility.

From the perspective of imparting desired ductility and malleability during forming, an annealed soft aluminum foil (e.g., aluminum foil made of the material 8021 or 8079 according to the Japanese Industrial Standards) is even more preferred as the aluminum foil.

The aluminum foil used for the aluminum foil layer 14 is preferably degreased, for example, to obtain desired electrolyte resistance. To simplify the production procedure, the aluminum foil preferably has a surface that is not etched. The degreasing treatment, for example, may be of wet or dry type. However, dry degreasing treatment is preferred from the perspective of simplifying the production procedure.

An example of dry degreasing treatment may be one where treatment time is increased in the step of annealing the aluminum foil. Sufficient electrolyte resistance may be obtained with the degreasing treatment that is carried out simultaneously with the annealing treatment for softening the aluminum foil.

The dry degreasing treatment may be one, such as flame treatment and corona treatment, that is other than the annealing treatment. Further, the dry degreasing treatment may be one that oxidatively decomposes and removes contaminants using oxygen radicals generated by irradiating the aluminum foil with ultraviolet rays at a specific wavelength.

For example, the wet degreasing treatment may be an acid degreasing treatment, alkaline degreasing treatment, or the like. Examples of the acid used for the acid degreasing treatment include inorganic acids, such as sulfuric acid, nitric acid, hydrochloric acid, and hydrofluoric acid. These acids may be used singly or in combination of two or more. Examples of alkali used for the alkaline degreasing treatment include sodium hydroxide having a strong etching effect. Alkaline degreasing treatment may be performed using a material formulated by adding a surfactant or the like to a weakly alkaline material. The wet degreasing treatment set forth above may be performed through immersion or spraying, for example.

The aluminum foil layer 14 has a 60° glossiness in MD (direction of extrusion during rolling) and a 60° glossiness in TD (direction vertical to MD) both being 690 or less, preferably 680 or less, and more preferably 670 or less. The glossiness of the aluminum foil layer 14 is considered to be affected by the surface roughness of the aluminum foil layer 14. Since different surface roughness leads to different strength in anchor effect accordingly, adhesion of the aluminum foil layer 14 to the sealant adhesive layer 16 is considered to change. When the above glossiness is 690 or less in both directions, good results are obtained from the compression test for the battery cells produced from the packaging material 10 for a power storage device.

In general, scratches parallel to MD occur during production of aluminum foil, and therefore there is a difference in glossiness between TD and MD of the aluminum foil. The difference in 60° glossiness between MD and TD of the aluminum foil layer 14 is 100 or less, preferably 80 or less, and more preferably 65 or less. When the difference in glossiness between both directions is 100 or less, well balanced surface roughness is obtained irrespective of the in-plane direction of the aluminum foil layer 14 and good adhesion is achieved with the sealant adhesive layer 16. If the difference in glossiness between both directions is more than 100, anisotropy of the surface roughness increases, and load is likely to be locally concentrated in the compression test for the battery cells produced from the packaging material 10 for a power storage device. Accordingly, in this case, durability of the packaging material 10 for a power storage device is likely to be impaired.

Aluminum foil generally has a glossy surface with greater glossiness and a mat surface with less glossiness. Generally used packaging materials for a power storage device are produced, with the mat surface facing the substrate layer 11. However, the mat surface may face the sealant layer 17 side. In this case, the 60° glossiness in both MD and TD may be 150 or less, preferably 140 or less, and more preferably 130 or less. In this case, the difference in glossiness between both directions may be 50 or less, preferably 45 or less, and more preferably 35 or less.

The glossiness of the aluminum foil layer 14 may be measured in a state of being provided with the anticorrosion treatment layer 15b described later. The aluminum foil layer 14 in a state of being provided with the anticorrosion treatment layer 15b has the 60° glossiness in MD and TD both being 590 or less, preferably 580 or less, and more preferably 570 or less. The glossiness of the aluminum foil layer 14 in a state of being provided with the anticorrosion treatment layer 15b is considered to be affected by the surface roughness of the aluminum foil layer 14. Since different surface roughness leads to different strength in anchor effect accordingly, adhesion of the aluminum foil layer 14 provided with the anticorrosion treatment layer 15b to the sealant adhesive layer 16 is considered to change. When the above glossiness is 590 or less in both directions, good results are obtained from the compression test for the battery cells produced from the packaging material 10 for a power storage device.

The aluminum foil layer 14 in a state of being provided with the anticorrosion treatment layer 15b may have a difference in 60° glossiness between MD and TD, which is 100 or less, preferably 70 or less, and more preferably 55 or less. When the difference in glossiness between both directions is 100 or less, well balanced surface roughness is obtained irrespective of the in-plane direction of the aluminum foil layer 14 and good adhesion is achieved with the sealant adhesive layer 16. If the difference in glossiness between both directions is more than 100, anisotropy of the surface roughness increases, and load is likely to be locally concentrated in the compression test for the battery cells produced from the packaging material 10 for a power storage device. Accordingly, in this case, durability of the packaging material 10 for a power storage device is likely to be impaired.

Aluminum foil generally has a glossy surface with greater glossiness and a mat surface with less glossiness. Generally used packaging materials for a power storage device are produced, with the mat surface facing the substrate layer 11. However, the mat surface may face the sealant layer 17 side. In this case, the 60° glossiness in both MD and TD may be 120 or less, preferably 110 or less, and more preferably 100 or less. In this case, the difference in glossiness between both directions may be 40 or less, preferably 35 or less, and more preferably 30 or less.

The glossiness described above is of a material before being produced into the packaging material 10, measured with a glossmeter.

From the perspective of barrier properties, pinhole resistance, and processability, the aluminum foil layer 14 preferably has a thickness in the range of 9 to 200 μm, more preferably 15 to 150 μm, and even more preferably 15 to 100 μm. The aluminum foil layer 14 with a thickness of 9 μm or more may be able to make the layer less breakable even when stress is applied thereto by forming. The aluminum foil layer 14 with a thickness of 200 μm or less may be able to curb the increase in mass of the packaging material and minimize the decrease in weight energy density of the power storage device.

In another embodiment, the aluminum foil may have sealant layer side surface roughness of 4.6 μm or more and 10.0 μm or less in terms of arithmetic mean height Sa, regardless of the value of the glossiness. To obtain better results from the compression test, Sa is preferably 4.6 μm or more. To reduce pinholes in the aluminum foil and reduce breakage thereof when formed, Sa is preferably 10.0 μm or less.

(Anticorrosion Treatment Layers 15a and 15b)

The anticorrosion treatment layers 15a and 15b prevent or suppress corrosion of the aluminum foil layer 14 due to the electrolyte or hydrofluoric acid produced by reaction of the electrolyte with water. The anticorrosion treatment layer 15a increases the adhesive force between the aluminum foil layer 14 and the adhesive layer 13. The anticorrosion treatment layer 15b increases the adhesive force between the aluminum foil layer 14 and the sealant adhesive layer 16. The anticorrosion treatment layers 15a and 15b may be identically formed or may be differently formed.

The anticorrosion treatment layers 15a and 15b can be formed by, for example, applying degreasing treatment, hydrothermal conversion treatment, anodizing treatment, chemical conversion treatment, or coating-type anticorrosion treatment wherein a coating agent having anticorrosion ability is coated, or a combination of these treatments, to a layer serving as a base material for the anticorrosion treatment layers 15a and 15b.

Among the treatments mentioned above, degreasing treatment, hydrothermal conversion treatment, and anodizing treatment, particularly hydrothermal conversion treatment and anodizing treatment are treatments to form a metal compound excellent in anticorrosion properties (aluminum compound (boehmite, alumite)) by melting a surface of metal foil (aluminum foil) by a treatment agent. In this sense, these treatments may be embraced within the definition of chemical conversion treatments because they provide a co-continuous structure that is formed covering from the aluminum foil layer 14 to the anticorrosion treatment layers 15a and 15b.

Examples of the degreasing treatment include acid degreasing treatment and alkaline degreasing treatment. The acid degreasing treatment may be one using the inorganic acid mentioned above, such as sulfuric acid, nitric acid, hydrochloric acid, or hydrofluoric acid, singly or using acid obtained by mixing them, or the like. Use of an acid degreasing agent, as the acid degreasing treatment, obtained by dissolving a fluorine-containing compound, such as monosodium ammonium bifluoride, with the above inorganic acid can not only achieve the degreasing effect of the aluminum foil layer 14, but form a passive state metal fluoride, and is thus effective in terms of hydrofluoric acid resistance. The alkaline degreasing treatment may be one using sodium hydroxide, or the like.

For example, the hydrothermal conversion treatment that can be used may be boehmite treatment of immersing the aluminum foil layer 14 in boiling water with triethanolamine added thereto. For example, the anodizing treatment may be alumite treatment. Examples of the chemical conversion treatment that can be used include chromate treatment, zirconium treatment, titanium treatment, vanadium treatment, molybdenum treatment, calcium phosphate treatment, strontium hydroxide treatment, cerium treatment, ruthenium treatment, or treatment that is a combination of two or more of these treatments. When performing the hydrothermal conversion treatment, anodizing treatment or chemical conversion treatment, the aforementioned degreasing treatment is preferably performed in advance.

The chemical conversion treatment is not limited to a wet type, but may be one, for example, in which treatment agents used for the treatment are mixed with a resin component and applied. The anticorrosion treatment may preferably be of a coating type chromate treatment because it maximizes the anticorrosion effect and is convenient for liquid waste disposal.

The coating agent used in the coating type anticorrosion treatment wherein a coating agent having anticorrosion ability is applied includes one which contains at least one selected from the group consisting of a rare earth element oxide sol, an anionic polymer and a cationic polymer. Especially, a preferred method is one using a coating agent containing a rare earth element oxide sol.

The method using a coating agent containing a rare earth element oxide sol is a pure coating type anticorrosion treatment. When using this method, an anticorrosion effect can be imparted to the aluminum foil layer 14 even according to ordinary coating methods. The layer formed by use of a rare earth element oxide sol has an anticorrosion effect (inhibitor effect) on the aluminum foil layer 14 and these sols are favorable materials from an environmental aspect.

The rare earth element oxide sol contains microparticles (e.g., particles having a mean particle size of 100 nm or less) of rare earth element oxide dispersed in a liquid dispersion medium. As the rare earth element oxide, mention can be made of cerium oxide, yttrium oxide, neodymium oxide, lanthanum oxide, or the like. Among these, cerium oxide is preferred. This allows more improvement in adhesion with the aluminum foil layer 14. Examples of the liquid dispersion medium used for the rare earth element oxide sol include various solvents, such as, water, alcoholic solvents, hydrocarbon-based solvents, ketone-based solvents, ester-based solvents, and ether-based solvents. Water is preferred among them. The rare earth element oxides contained in the anticorrosion treatment layers 15a and 15b may be used singly or in combination of two or more.

To stabilize dispersion of the rare earth element oxide particles, the rare earth element oxide sol preferably contains a dispersion stabilizer, including an inorganic acid, such as nitric acid, hydrochloric acid, or phosphoric acid, an organic acid, such as acetic acid, malic acid, ascorbic acid, or lactic acid, a salt of these acids, or the like. Of these dispersion stabilizers, phosphoric acid or phosphate in particular is preferably used. In addition to stabilizing dispersion of the rare earth element oxide particles, use of these materials achieves such effects, in the usage of the packaging material for a lithium ion battery, as improving adhesion to the aluminum foil layer 14 with the chelating ability of phosphoric acid, imparting electrolyte resistance by trapping metal ions eluted due to the influence of hydrofluoric acid (forming a passive state), improving cohesive force of the rare earth element oxide layer due to the ease of producing dehydration condensation of phosphoric acid even at low temperatures, and the like. Examples of the phosphoric acid or phosphate used as the dispersion stabilizer include orthophosphoric acid, pyrophosphoric acid, metaphosphoric acid, alkali metal salt or ammonium salt thereof, and the like. Of these materials, condensed phosphoric acid, such as trimetaphosphoric acid, tetrametaphosphoric acid, hexametaphosphoric acid, and ultrametaphosphoric acid, or alkali metal salt or ammonium salt thereof is preferred in terms of allowing the packaging material for a lithium ion battery to express its function. In particular, considering the dry film formability (drying capacity, heat capacity) when forming a layer containing rare earth oxide through various types of coating method using a coating composition containing the rare earth element oxide sol, an agent having good reactivity at low temperatures is preferred. Specifically, a sodium salt is preferred because of its good dehydration condensation properties at low temperatures. As the phosphate, a water-soluble salt is preferred. Phosphoric acid or phosphate contained in the anticorrosion treatment layers 15a and 15b may be of a single type or a combination of two or more types.

Phosphoric acid or salt thereof is blended in the rare earth element oxide sol preferably in an amount of 1 part by mass or more, and more preferably 5 parts by mass or more, relative to 100 parts by mass of rare earth element oxide. A content of 1 part by mass or more can achieve good stability of the sol and easily satisfy the function as the packaging material for a lithium ion battery. The upper limit of phosphoric acid or salt thereof to be blended relative to 100 parts by mass of rare earth element oxide may be in a range not lowering the function of the rare earth element oxide sol, and may preferably be 100 parts by mass or less, more preferably 50 parts by mass or less, and even more preferably 20 parts by mass or less, relative to 100 parts by mass of rare earth element oxide.

The layer formed from the rare earth element oxide sol is an aggregate of inorganic particles and therefore the cohesive force of the layer is low even after a dry curing step. To compensate the cohesive force of this layer, complexing with an anionic polymer is favorable.

A specific example of the anionic polymer may be a polymer having a carboxyl group, examples of which include poly(meth)acrylic acid (or a salt thereof) and copolymers having poly(meth)acrylic acid as a main component thereof. Examples of the copolymerization component of the copolymers include: alkyl(meth)acrylate-based monomers (of which examples of alkyl groups include a methyl group, an ethyl group, an n-propyl group, an i-propyl group, an n-butyl group, an i-butyl group, a t-butyl group, a 2-ethylhexyl group, and a cyclohexyl group); amide group-containing monomers, such as (meth)acrylamide, N-alkyl(meth)acrylamide, N,N-dialkyl(meth)acrylamide (of which examples of alkyl groups include a methyl group, an ethyl group, an n-propyl group, an i-propyl group, an n-butyl group, an i-butyl group, a t-butyl group, a 2-ethylhexyl group, and a cyclohexyl group), N-alkoxy(meth)acrylamide, N,N-dialkoxy(meth)acrylamide (of which examples of alkoxy groups include a methoxy group, an ethoxy group, a butoxy group, and an isobutoxy group), N-methylol(meth)acrylamide, and N-phenyl(meth)acrylamide; hydroxyl group-containing monomers, such as 2-hydroxyethyl(meth)acrylate and 2-hydroxypropyl(meth)acrylate; glycidyl group-containing monomers, such as glycidyl(meth)acrylate and allyl glycidyl ether; silane-containing monomers, such as (meth)acryloxypropyl trimethoxysilane and (meth)acryloxypropyl triethoxysilane; and isocyanate group-containing monomers, such as (meth)acryloxypropyl isocyanate. The examples also include styrene, α-methylstyrene, vinyl methyl ether, vinyl ethyl ether, maleic acid, alkyl maleate monoester, fumaric acid, alkyl fumarate monoester, itaconic acid, alkyl itaconate monoester, (meth)acrylonitrile, vinylidene chloride, ethylene, propylene, vinyl chloride, vinyl acetate, and butadiene.

The anionic polymer improves the stability of the anticorrosion treatment layers 15a and 15b (oxide layers) obtained using the rare earth element oxide sol. This is achieved by the effect of protecting the hard and brittle oxide layers with an acrylic resin component, and the effect of capturing ionic contamination (particularly, sodium ion) derived from the phosphate contained in the rare earth oxide sol (cation catcher). In other words, when alkali metal ion or alkaline earth metal ion, such as sodium in particular, is contained in the anticorrosion treatment layers 15a and 15b obtained by use of the rare earth element oxide sol, the anticorrosion treatment layers 15a and 15b are prone to deteriorate starting from the ion-containing site. Accordingly, sodium ion or the like contained in the rare earth oxide sol is immobilized by use of the anionic polymer to thereby improve durability of the anticorrosion treatment layers 15a and 15b.

The anticorrosion treatment layers 15a and 15b produced by combining the anionic polymer with the rare earth element oxide sol have anticorrosion ability equivalent to that of the anticorrosion treatment layers 15a and 15b formed by applying chromate treatment to the metal aluminum layer 14. The anionic polymer preferably has a structure where a substantially water-soluble polyanionic polymer is cross-linked. For example, the cross-linking agent used for forming this structure may be a compound having an isocyanate group, a glycidyl group, a carboxy group, or an oxazoline group. A silane coupling agent may be used for introducing a cross-linking site having a siloxane bond.

Examples of the compound having an isocyanate group include: diisocyanates such as tolylene diisocyanate, xylylene diisocyanate or its hydrogenated product, hexamethylene diisocyanate, 4,4'-diphenylmethane diisocyanate or its hydrogenated product, and isophorone diisocyanate; polyisocyanates including adducts of these isocyanates reacted with polyhydric alcohols such as trimethylolpropane, biuret forms obtained by reaction of the isocyanates with water, or isocyanurate forms that are trimers of the isocyanates; or blocked polyisocyanates obtained by blocking these polyisocyanates with alcohols, lactams, oximes and the like.

Examples of the compound having a glycidyl group include: epoxy compounds obtained by reaction of glycols, such as ethylene glycol, diethylene glycol, triethylene glycol, polyethylene glycol, propylene glycol, dipropylene glycol, tripropylene glycol, polypropylene glycol, 1,4-butadiene, 1,6-hexanediol, and neopentyl glycol, with epichlorohydrin; epoxy compounds obtained by reaction of polyhydric alcohols, such as glycerine, polyglycerine, trimethylolpropane, pentaerythritol, and sorbitol, with epichlorohydrin; and epoxy compounds obtained by reaction of dicarboxylic acids, such as phthalic acid, terephthalic acid, oxalic acid, and adipic acid, with epichlorohydrin.

The compounds having a carboxy group include various aliphatic or aromatic dicarboxylic acids, and include, further, poly(meth)acrylic acids, or alkali (earth) metal salts of poly(meth)acrylic acids.

The compounds having an oxazoline group include, for example, low molecular weight compounds having two or more oxazoline units. Alternatively, where polymerizable monomers such as isopropenyl oxazoline are used, mention may be made of compounds obtained by copolymerizing acrylic monomers such as (meth)acrylic acid, (meth)acrylic alkyl esters, hydroxyalkyl (meth)acrylates and the like.

The silane coupling agents include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropylethoxysilane. Especially, when the reactivity with an anionic polymer is considered, an epoxysilane, an aminosilane and an isocyanate silane are preferred.

The cross-linking agent is blended in an amount preferably in the range of 1 to 50 parts by mass, and more preferably from 10 to 20 parts by mass, relative to 100 parts by mass of the anionic polymer. When the ratio of the cross-linking agent is 1 part by mass or more relative to 100 parts by mass of the anionic polymer, a cross-linking structure is easily sufficiently formed. When the ratio of the cross-linking agent is 50 parts by mass or less relative to 100 parts by mass of the anionic polymer, the pot life of the coating agent improves.

The method of cross-linking the anionic polymer is not limited to the use of the aforementioned cross-linking agents, but may be one using a titanium or zirconium compound to form ionic crosslinkage. The coating composition forming the anticorrosion treatment layer 15a may be applied to these materials.

The anticorrosion treatment layers 15a and 15b described above are formed as chemical conversion treatment layers on the aluminum foil layer 14 using chemical conversion treatment, typical of which is chromate treatment. To form a graded structure in association with the aluminum foil layer 14, the aluminum foil layer 14 is treated, in the chemical conversion treatment, with a chemical conversion treatment agent, which is particularly formulated with addition of hydrofluoric acid, hydrochloric acid, nitric acid, sulfuric acid or a salt thereof. The treated aluminum foil layer 14 is then reacted with a chromium or non-chromium compound to form the chemical conversion treatment layers on the aluminum foil layer 14. However, the chemical conversion treatment using the acid as the chemical conversion treatment agent may entail environmental degradation and corrosion of the coating apparatus.

In contrast, the anticorrosion treatment layers 15a and 15b of coating type as mentioned above do not have to form a graded structure with respect to the aluminum foil layer 14, unlike in the chemical conversion treatment typical of which is chromate treatment. Accordingly, the nature of the coating agent should not be restricted to acidity, alkalinity, neutrality, or the like, and accordingly a good work environment is achieved. In addition, an alternative to chromate treatment using a chromium compound is sought in terms of environmental health. From this perspective as well, the anticorrosion treatment layers 15a and 15b of coating type are preferred.

The anticorrosion treatment layers 15a and 15b may have a laminated structure in which a cationic polymer is further laminated as needed. The cationic polymer may be polyethyleneimine, an ionic polymer complex made of a polyethyleneimine and a polymer having carboxylic acid, a primary amine-grafted acrylic resin having a primary amine grafted to a main acrylic backbone, polyallylamine and derivatives thereof, or an aminophenol resin.

Examples of the "polymer having carboxylic acid" forming the ionic polymer complex include polycarboxylic acid (salt), a copolymer produced by introducing a comonomer into polycarboxylic acid (salt), and polysaccharides having a carboxy group. Examples of the polycarboxylic acid (salt) include polyacrylic acid, and ionic salts thereof. Examples of the polysaccharides having a carboxy group include carboxymethylcellulose, and ionic salts thereof. Examples of the ionic salt include an alkali metal salt, and alkaline earth metal.

The primary amine-grafted acrylic resin is a resin having a primary amine grafted to a main acrylic backbone. The acrylic main backbone may include various monomers, such as poly(meth)acrylic acid, used for the acrylic polyol mentioned above. The primary amine grafted to the acrylic main backbone may be ethyleneimine or the like.

The polyallylamine or a derivative thereof that can be used may be a homopolymer or a copolymer of allylamine, allylamine amide sulfate, diallylamine, dimethylallylamine, and the like. These amines may be used in the form of free amine, or may be stabilized by acetic acid or hydrochloric acid. The copolymer may contain maleic acid, sulfur dioxide, or the like as a component. A type of amine imparted with thermal cross-linking properties by partially methoxylating a primary amine may be used. These cationic polymers may be used singly or in combination of two or more. Of these cationic polymers, at least one selected from the group consisting of polyallylamine and a derivative thereof is preferred.

The cationic polymer is preferably used in combination with a cross-linking agent having a functional group capable of reacting with amine/imine, such as a carboxy group or a glycidyl group. The cross-linking agent to be used in combination with the cationic polymer may be a polymer having carboxylic acid that forms an ionic polymer complex with polyethyleneimine, of which examples include: polycarboxylic acid (salt), such as polyacrylic acid or ionic salt thereof; a copolymer produced by introducing a comonomer thereinto; polysaccharides having a carboxy group, such as carboxymethylcellulose or ionic salt thereof.

In the present embodiment, a cationic polymer is described as a component constituting the anticorrosion treatment layers 15a and 15b. This is based on an intensive investigation using various compounds to find ones imparting electrolyte resistance and hydrofluoric acid resistance to the packaging material for a lithium ion battery as required thereof. As a result, cationic polymers have been found to be compounds that are capable of imparting electrolyte resistance and hydrofluoric acid resistance. This is believed to be because damage to the aluminum foil layer 14 is suppressed and reduced by capturing fluoride ion with the cationic group (anion catcher). The cationic polymer is also quite preferred from the perspective of improving adhesion between the anticorrosion treatment layer 15b and the sealant adhesive layer 16. Since the cationic polymer is water soluble similar to the anionic polymer mentioned above, water resistance is improved by forming a cross-linking structure using the cross-linking agent mentioned above. Thus, a cross-linking structure can also be formed by using the cationic polymer. Accordingly, when the rare earth oxide sol is used for forming the anticorrosion treatment layers 15a and 15b, the cationic polymer may be used as the protective layer instead of the anionic polymer.

From the above description, combinations of the above coating type anticorrosion treatments may be (1) rare earth oxide sol alone, (2) anionic polymer alone, (3) cationic polymer alone, (4) rare earth oxide sol+anionic polymer (laminated composite), (5) rare earth oxide sol+cationic polymer (laminated composite), (6) (rare earth oxide sol+ anionic polymer: laminated composite)/cationic polymer (multilayer), (7) (rare earth oxide sol+cationic polymer: laminated composite)/anionic polymer (multilayer), and the like. Of these combinations, (1) and (4) through (7) are preferred and (4) through (7) are more preferred. For the anticorrosion treatment layer 15a, (6) is particularly preferred because an anticorrosion effect and an anchor effect (adhesion improvement effect) are achieved by a single layer. For the anticorrosion treatment layer 15b, (6) and (7) are particularly preferred because it is easier to keep the sealant layer 17 side electrolyte resistance. However, the present embodiment is not limited to the above combinations. An example of selecting the anticorrosion treatment is as follows. Specifically, when the sealant adhesive layer 16 is formed of a modified polyolefin resin, the cationic polymer is designed to be provided on the surface contacting the sealant adhesive layer 16 (e.g., configurations (5) and (6)) since the cationic polymer is a material quite preferable in terms of good adhesion with a modified polyolefin resin that will be mentioned in the sealant adhesive layer 16 below.

The anticorrosion treatment layers 15a and 15b are not limited to the layers described above. For example, they may be formed by using an agent produced by blending phosphoric acid and a chromium compound into a resin binder (aminophenol resin etc.), as in a coating type chromate based on a known technique. Use of this treatment agent enables formation of a layer that is both corrosion-resistant and adhesive. To improve adhesion, the chemical conversion treatment layer described above (the layer formed through degreasing treatment, hydrothermal conversion treatment, anodizing treatment, chemical conversion treatment, or a combination thereof) may be treated in a composite manner using the cationic polymer and/or the anionic polymer mentioned above. Alternatively, using these treatments in combination, the cationic polymer and/or the anionic polymer may be laminated as a multilayer structure. While the stability of the coating agent has to be considered, a layer that is both corrosion-resistant and adhesive can be achieved by using a coating agent that is a one-liquid product of the rare earth oxide sol and the cationic polymer or the anionic polymer obtained in advance.

The anticorrosion treatment layers 15a and 15b preferably have mass per unit area in the range of 0.005 to 0.200 g/m$^2$, and more preferably 0.010 to 0.100 g/m$^2$. When 0.005 g/m$^2$ or more, the aluminum foil layer 14 can be easily made corrosion-resistant. The mass per unit area exceeding 0.200 g/m$^2$ will saturate the anticorrosivity and make little change therein. In contrast, when the rare earth oxide sol is used, a thick coating may cause insufficient thermal curing during drying and decrease the cohesive force. Although the above description is given using mass per unit area, the specific gravity, if available, can be used in terms of thickness.

The respective thicknesses of the anticorrosion treatment layers 15a and 15b are preferably, for example, in the range of 10 nm to 5 μm, and more preferably 20 nm to 500 nm, from the perspective of corrosion-resistant and anchoring functions. The sealant layer 17 side anticorrosion treatment layer 15b preferably has a thickness not fully filling the asperities of the surface roughness of the aluminum foil layer 14. The thickness is preferably in the range of 0.1 to 10% of the height of the asperities formed in the surface of the aluminum foil layer 14 and more preferably 0.5 to 5%.

(Sealant Adhesive Layer 16)

The sealant adhesive layer 16 adheres the sealant layer 17 to the aluminum foil layer 14 formed with the anticorrosion treatment layer 15b. The packaging material 10 is roughly categorized into a heat lamination structure and a dry lamination structure, depending on the adhesive component forming the sealant adhesive layer 16.

The adhesive component forming the sealant adhesive layer 16 in the heat lamination structure is preferably an acid modified polyolefin-based resin obtained by graft modifying a polyolefin-based resin with acid. The acid modified polyolefin-based resin, which has a polar group introduced into part of the nonpolar polyolefin-based resin, can firmly adhere to both the sealant layer 17 composed of a nonpolar polyolefin-based resin film or the like, and the anticorrosion treatment layer 15b mostly having polarity. Use of the acid modified polyolefin-based resin improves resistance of the packaging material 10 to the contents, such as the electrolyte, and easily prevents lowering of the adhesive force due to deterioration of the sealant adhesive layer 16 even when hydrofluoric acid is produced inside the battery.

Examples of the polyolefin-based resin for the acid modified polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. The polyolefin resin that can be used may also be a copolymer obtained by copolymerizing polar molecules such as of acrylic acid or methacrylic acid with those materials mentioned above, a polymer such as cross-linked polyolefin, or the like. The acid to modify the polyolefin-based resin may be carboxylic acid, an epoxy compound, acid anhydride, or the like, and maleic anhydride is preferred. The acid modified polyolefin-based resins used for the sealant adhesive layer 16 may be used singly or in combination of two or more.

The sealant adhesive layer 16 of the heat lamination structure is formed by extruding the aforementioned adhesive component with an extruder. The sealant adhesive layer 16 of the heat lamination structure preferably has a thickness in the range of 2 to 50 μm.

The adhesive component forming the sealant adhesive layer 16 of the dry lamination structure may be ones, for example, similar to those mentioned for the adhesive layer 13. In this case, to prevent or reduce swelling due to the electrolyte, and hydrolysis due to hydrofluoric acid, the composition of the adhesive is preferably designed so as to contain a main resin with a backbone not easily hydrolyzed and improve cross-linking density.

To improve cross-linking density, another substance may be added to the adhesive, the substance being, for example, a dimer fatty acid, an ester or a hydrogenated product of the dimer fatty acid, a reduced glycol of the dimer fatty acid, or a reduced glycol of the ester or the hydrogenated product of the dimer fatty acid. The dimer fatty acid is obtained by dimerizing various unsaturated fatty acids, and can have a structure, for example, of acyclic type, monocyclic type, polycyclic type, and aromatic ring type.

The fatty acid as a starter of the dimer fatty acid is not particularly limited. With such dimer fatty acid as being an essential component, a dibasic acid such as that used for ordinary polyester polyol may be introduced. The curing agent that can be used for the main resin forming the sealant adhesive layer 16 may be, for example, an isocyanate compound that may also be used as a chain elongation agent for polyester polyol. Thus, cross-linking density of the adhesive coating increases, which leads to improving solubility and swelling properties. Also, substrate adhesion is also expected to be improved due to increase in urethane group concentration.

The sealant adhesive layer 16 having the dry laminate structure has a bonding part such as of an ester group and a urethane group which is easily hydrolysable. Therefore, for usage requiring much higher reliability, an adhesive component having a heat lamination structure is preferably used as the sealant adhesive layer 16. For example, the various curing agents mentioned above are blended into a coating agent wherein the acid modified polyolefin resin is dissolved or dispersed in a solvent, such as toluene or methylcyclohexane (MCH), followed by application and drying to thereby form the sealant adhesive layer 16.

When forming the sealant adhesive layer 16 using extrusion molding, the adhesion resin tends to be oriented in MD (extrusion direction) due to the stress or the like generated during the extrusion molding. In this case, to alleviate the anisotropy of the sealant adhesive layer 16, an elastomer may be blended in the sealant adhesive layer 16. As the elastomer to be blended in the sealant adhesive layer 16, for example, an olefin-based elastomer, a styrene-based elastomer, or the like may be used.

The elastomer preferably has a mean particle size that can improve the compatibility of the elastomer with the adhesive resin and improve the effect of alleviating the anisotropy of the sealant adhesive layer 16. Specifically, the mean particle size of the elastomer is preferably 200 nm or less, for example.

The mean particle size of the elastomer is determined by, for example, capturing an enlarged image of a cross section of an elastomer composition using an electron microscope, followed by image analysis for the measurement of a mean particle size of dispersed cross-linked rubber components. The elastomers mentioned above may be used singly or in combination of two or more.

If an elastomer is blended in the sealant adhesive layer 16, the amount of the elastomer added to the sealant adhesive layer 16 (100 mass %) is, for example, preferably in the range of 1 to 25 mass % and more preferably 10 to 20 mass %. When the blending amount of the elastomer is 1 mass % or more, improvement is likely to be achieved in compatibility with the adhesion resin, and also in the effect of alleviating the anisotropy of the sealant adhesive layer 16. When the blending amount of the elastomer is 25 mass % or less, improvement is likely to be achieved in the effect of preventing or reducing swelling of the sealant adhesive layer 16 due to the electrolyte.

The sealant adhesive layer 16 may be, for example, a dispersed adhesive resin solution in which an adhesive resin is dispersed in an organic solvent.

The sealant adhesive layer 16 when provided to the heat lamination structure preferably has a thickness in the range of 8 μm or more to 50 μm or less, and more preferably 20 μm or more to 40 μm or less. The sealant adhesive layer 16 having a thickness of 8 μm or more can easily obtain sufficient strength of adhering the aluminum foil layer 14 provided with the anticorrosion treatment layer 15b to the sealant layer 17. The sealant adhesive layer 16 having a thickness of 50 μm or less can easily reduce the amount of water penetrating from an end surface of the packaging material into the battery element in the interior. The sealant adhesive layer 16 when provided to the dry lamination structure preferably has a thickness in the range of 1 μm or more to 5 μm or less. The sealant adhesive layer 16 having a thickness of 1 μm or more can easily obtain sufficient strength of adhering the aluminum foil layer 14 provided with the anticorrosion treatment layer 15b to the sealant layer 17. The sealant adhesive layer 16 having a thickness of 5 μm or less is capable of preventing or reducing cracking therein.

(Sealant Layer 17)

The sealant layer 17 imparts sealability to the packaging material 10 when heat sealed, and is located on the inward side for heat sealing when the power storage device is assembled. The sealant layer 17 may be a resin film made of a polyolefin-based resin or an acid-modified polyolefin-based resin obtained by graft-modifying a polyolefin-based resin with acid such as maleic anhydride. Of these materials, a polyolefin-based resin that improves the barrier properties against water vapor and is capable of forming the shape of the power storage device without being excessively deformed by heat sealing is preferred, and polypropylene is particularly preferred.

Examples of the polyolefin-based resin include: low-, medium- and high-density polyethylenes; ethylene-α olefin copolymers; polypropylenes; and propylene-α olefin copolymers. The polyolefin resin in the form of a copolymer may be a block copolymer or may be a random copolymer. These polyolefin-based resins may be used singly or in combination of two or more.

Some substance may be added to the above types of polypropylenes, that is, random polypropylene, homo polypropylene, and block polypropylene, the substance being a low crystallinity ethylene-butene copolymer, a low crystallinity propylene-butene copolymer, terpolymer formed of a three-component copolymer of ethylene, butene, and propylene, an anti-blocking agent (AB agent), such as silica, zeolite, and acrylic resin beads, a slip agent, such as a fatty acid amide, or the like.

The acid-modified polyolefin-based resin includes, for example, those resins which are similar to ones mentioned in the sealant adhesive layer 16.

The sealant layer 17 may be a single layer film or may be a multilayer film, which may be selected according to the required ability. For example, to impart moisture resistance, a multilayer film with interposition of resins, such as an ethylene-cyclic olefin copolymer and polymethylpentene, may be used.

The sealant layer 17 may contain various additives, such as a flame retardant, a slip agent, an anti-blocking agent, an antioxidant, a photostabilizer, and a tackifier.

A heat sealable film formed by extrusion may be used as the sealant layer 17. In this case, the orientation of the sealable film tends to conform to the direction of its extrusion. Therefore, from the perspective of alleviating the anisotropy of the sealant layer 17 due to the orientation, an elastomer may be blended in the heat sealable film. Blending an elastomer, blushing of the sealant layer 17 is prevented or reduced when the packaging material 10 for a power storage device is cold-formed for formation of a recess.

The elastomer that can be used for forming the sealant layer 17 may be, for example, the same materials as those mentioned as the elastomer forming the sealant adhesive layer 16. When the sealant layer 17 has a multilayer film structure, at least one of the plurality of layers constituting the multilayer film structure may be configured to contain the elastomer. For example, when the sealant layer 17 has a three-layer laminated structure of random polypropylene layer/block polypropylene layer/random polypropylene layer, the elastomer may be blended in only the block polypropylene layer or only in the random polypropylene layers, or may be blended in both the random polypropylene layers and the block polypropylene layer.

The sealant layer 17 may contain a lubricant to impart lubricity thereto. Then, a recess is formed in the packaging material 10 for a power storage device by cold forming, the sealant layer 17 containing a lubricant can prevent the packaging material 10 from being stretched more than necessary in the areas to be shaped into side portions and corners of the recess where stretching degree is high. This can prevent separation between the aluminum foil layer 14 and the sealant adhesive layer 16, or prevent breaking and blushing due to cracks in the sealant layer 17 and the sealant adhesive layer 16.

When the sealant layer 17 contains a lubricant, the content in the sealant layer 17 (100 mass %) is preferably in the range of 0.001 mass % to 0.5 mass %. When the content of lubricant is 0.001 mass % or more, blushing of the sealant layer 17 is likely to be further reduced during cold forming. When the content of lubricant is 0.5 mass % or less, lowering in adhesion strength is likely to be minimized with respect to a surface of another layer contacting a surface of the sealant layer 17.

The sealant layer 17 preferably has a thickness in the range of 10 to 100 μm, and more preferably 20 to 60 μm. The sealant layer 17 with a thickness of 20 μm or more achieves sufficient heat sealing strength. The sealant layer 17 with a thickness of 90 μm or less reduces the amount of water vapor penetration from an end of the packaging material.

[Method of Producing Packaging Material]

A method of producing the packaging material 10 will be described. The method of producing the packaging material 10 is not limited to the following method.

For example, the method of producing the packaging material 10 may be a method including the following steps S11 to S13.

Step S11: Forming the anticorrosion treatment layer 15a on a surface of an aluminum foil layer 14 and forming the corrosion inhibition treatment layer 15b on the other surface of the aluminum foil layer 14.

Step S12: Bonding a surface of the anticorrosion treatment layer 15a on a side opposite of the surface where the aluminum foil layer 14 is laminated, to a surface of the substrate layer 11 via the adhesive layer 13.

Step S13: Forming the sealant layer 17 on a surface of the anticorrosion treatment layer 15b on a side opposite of the surface where the aluminum foil layer 14 is laminated via the sealant adhesive layer 16.

(Step S11)

At step S11, the anticorrosion treatment layer 15a is formed on a surface of the aluminum foil layer 14 and the corrosion inhibition treatment layer 15b is formed on the other surface of the aluminum foil layer 14. The anticorrosion treatment layers 15a and 15b may be formed separately or simultaneously. Specifically, for example, an anticorrosion treatment agent (base material of the anticorrosion treatment layers) is applied to both surfaces of the aluminum foil layer 14, followed by drying, curing, and baking sequentially to simultaneously form the anticorrosion treatment layers 15a and 15b. Alternatively, an anticorrosion treatment agent may be applied to a surface of the aluminum foil layer 14, sequentially followed by drying, curing, and baking to form the anticorrosion treatment layer 15a. Then, the anticorrosion treatment layer 15b may be similarly formed on the other surface of the aluminum foil layer 14. The order of forming the anticorrosion treatment layers 15a and 15b is not particularly limited. The anticorrosion treatment agent to be used may be different or the same between the anticorrosion treatment layers 15a and 15b. As the anticorrosion treatment agent, for example, one for coating type chromate treatment, or the like may be used. Examples of the method of applying the anticorrosion treatment include, but are not particularly limited to, gravure coating, gravure reverse coating, roll coating, reverse roll coating, die coating, bar coating, kiss coating, and comma coating. As the aluminum foil layer 14, an untreated aluminum foil layer may be used, or an aluminum foil layer subjected to wet or dry degreasing treatment may be used.

(Step S12)

At step S12, a surface of the anticorrosion treatment layer 15a, on a side opposite of the surface where the aluminum foil layer 14 is laminated, is bonded to a surface of the substrate layer 11 by dry lamination or the like using an adhesive forming the adhesive layer 13. At step S12, aging treatment may be performed at a temperature in the range of room temperature to 100° C. to accelerate adhesion. Aging time is, for example, 1 to 10 days.

(Step S13)

Following step S12, the sealant layer 17 is formed, via the sealant adhesive layer 16, on a surface of the anticorrosion treatment layer 15b on a side opposite of the surface where the aluminum foil layer 14 is laminated, in the laminate having the substrate layer 11, the adhesive layer 13, the anticorrosion treatment layer 15a, the aluminum foil layer 14, and the anticorrosion treatment layer 15b laminated in this order. The sealant layer 17 may be laminated by dry lamination, sandwich lamination, or the like, or may be laminated together with the sealant adhesive layer 16 by coextrusion. To improve adhesion, the sealant layer 17 is preferably laminated by, for example, sandwich lamination or laminated together with the sealant adhesive layer 16 by coextrusion, and is more preferably laminated by sandwich lamination.

The packaging material 10 is obtained through the steps S11 to S13 described above. The order of steps in the method of producing the packaging material 10 is not limited to that of the above method where steps S11 to S13 are sequentially performed. The order of steps may be appropriately changed. For example, step S13 may be followed by step S12.

[Power Storage Device]

A power storage device provided with the packaging material 10 as a container will be described. The power storage device includes: a battery element 1 including electrodes; leads 2 extending from the electrodes; and a container holding the battery element 1. The container is formed of the packaging material 10 for a power storage device, with the sealant layer 17 inside. The container may be obtained by overlapping two packaging materials with the sealant layers 17 face-to-face, and heat-sealing the edge portions of the overlapped packaging materials 10, or may be obtained by folding a single packaging material so that the surfaces are overlapped with each other and similarly heat-sealing the edge portions of the packaging material 10. The power storage device may have the packaging material 20 as a container. Examples of the power storage device include secondary batteries, such as lithium ion batteries, nickel hydride batteries, and lead batteries, and electrochemical capacitors, such as electric double layer capacitors.

The leads 2 are sandwiched and hermetically sealed by the packaging material 10 forming the container with the sealant layer 17 inside. The leads 2 may be sandwiched by the packaging material 10 via a tab sealant.

[Method of Producing Power Storage Device]

Figure 2A:
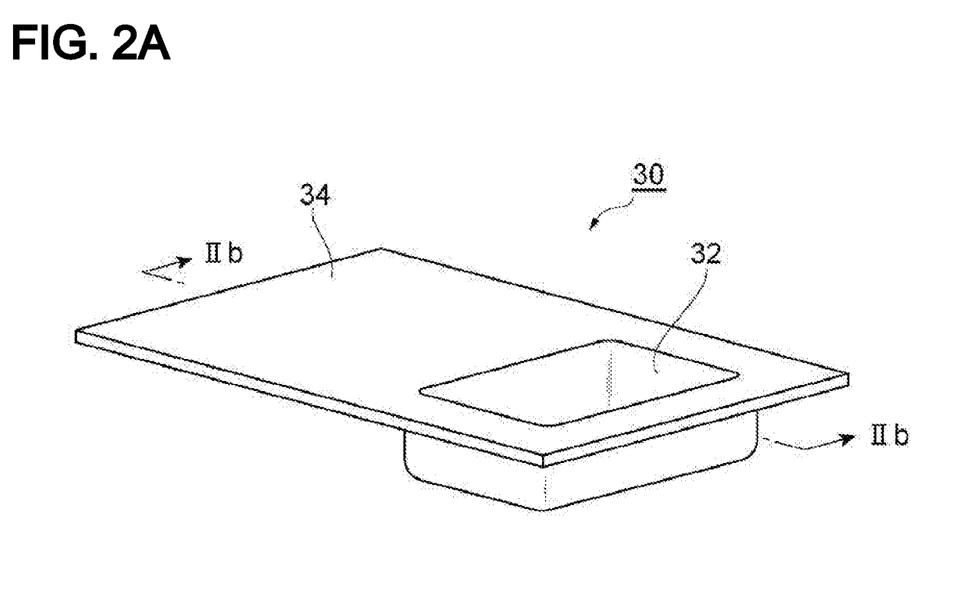
FIGS. 2A and 2B are diagrams illustrating an embossed packaging material obtained using the power storage device packaging material according to an embodiment of the present invention, with FIG. 2A being a perspective view of the embossed packaging material, and FIG. 2B being a vertical cross-sectional view of the embossed packaging material shown in FIG. 2A taken along the line IIb-IIb.
Figure 2B:
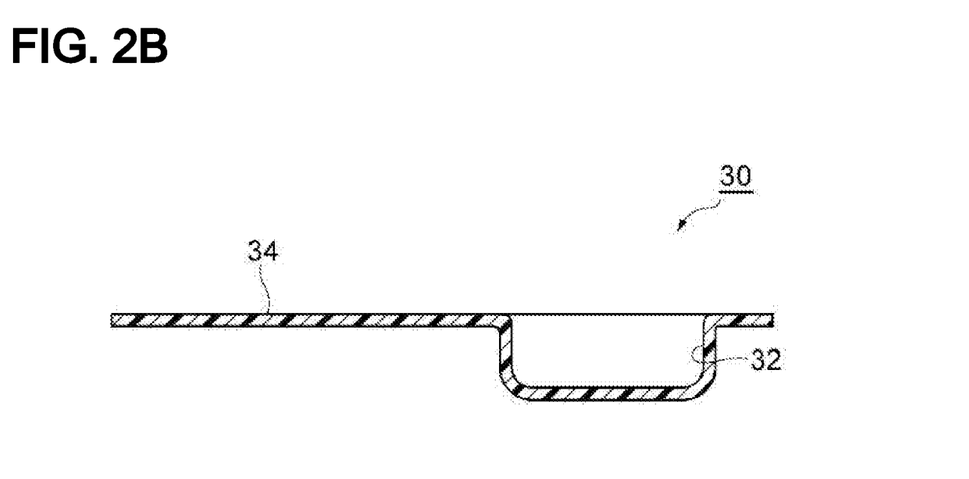

A method of producing the power storage device using the packaging material 10 will be described. The description herein is given taking as an example the case of producing a secondary battery 40 using an embossed packaging material 30. FIGS. 2A and 2B show a set of diagrams each illustrating the embossed packaging material 30. FIGS. 3A, 3B, 3C, and 3D show a set of diagrams FIGS. 3A, 3B, 3C, and 3D, each being a perspective view of a production procedure of a single-sided battery using the packaging material 10. The secondary battery 40 may be a double-sided battery produced by providing two packaging materials similar to the embossed packaging material 30, and bonding the packaging materials to each other while alignment is adjusted. The embossed packaging material 30 may be formed using a packaging material 20.

The secondary battery 40, which is a single-sided battery, can be produced through steps S21 to S25 below, for example.

Step S21: Preparing the packaging material 10, the battery element 1 including electrodes, and the leads 2 extending from the electrodes.

Step S22: Forming a recess 32 for disposing the battery element 1 therein on a surface of the packaging material 10 (see FIG. 3A and FIG. 3B).

Figure 3A:
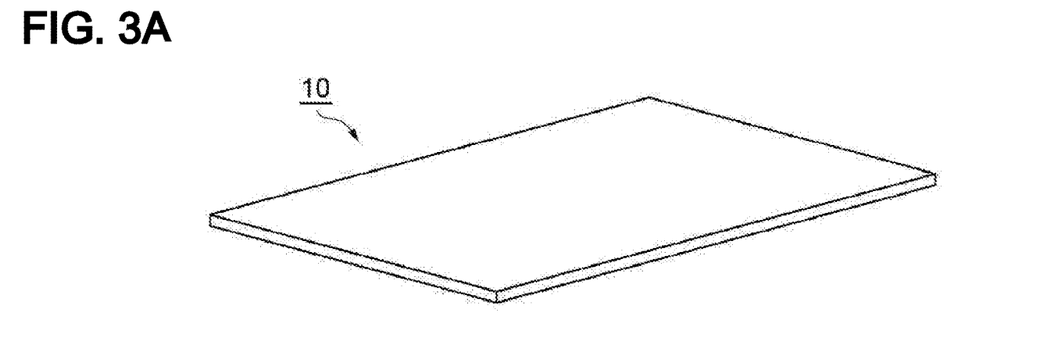
FIGS. 3A, 3B, 3C, and 3D are perspective views illustrating a process of producing a secondary battery using the power storage device packaging material according to an embodiment of the present invention, with FIG. 3A showing the power storage device packaging material, FIG. 3B showing the power storage device packaging material that has been embossed, and a battery element, FIG. 3C showing the power storage device packaging material that has been folded with an end portion being heat-sealed, and FIG. 3D showing a state in which both sides of the folded portion are turned up.
Figure 3B:
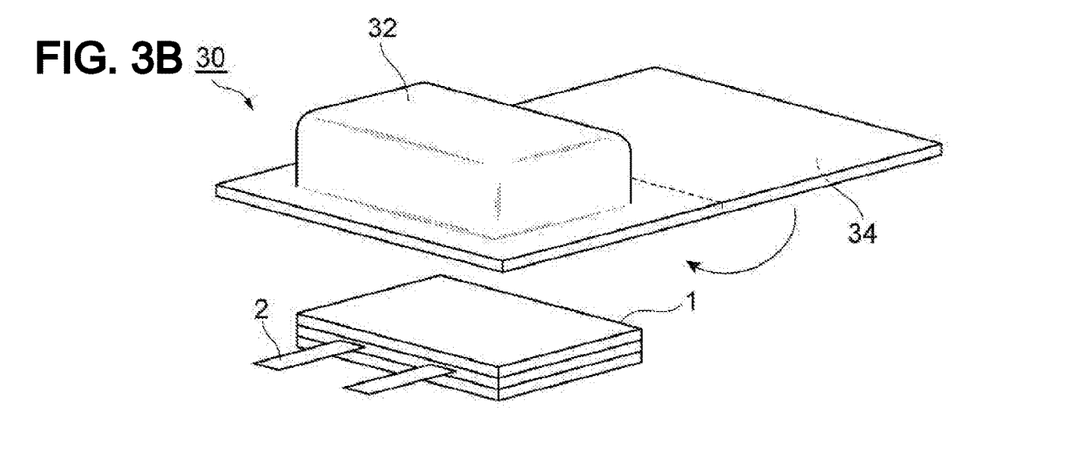
Figure 3C:
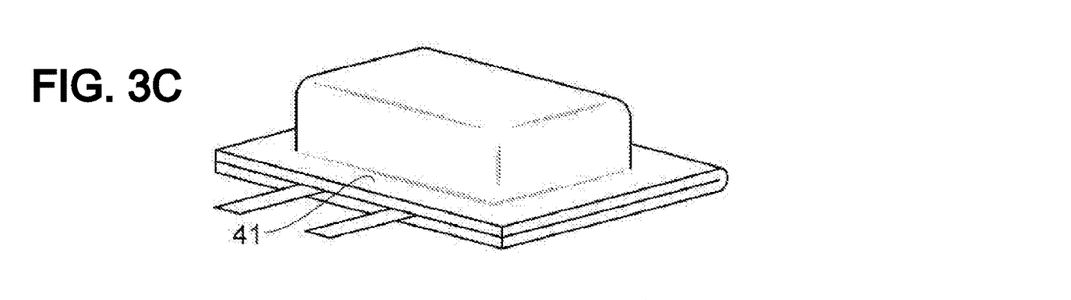
Figure 3D:
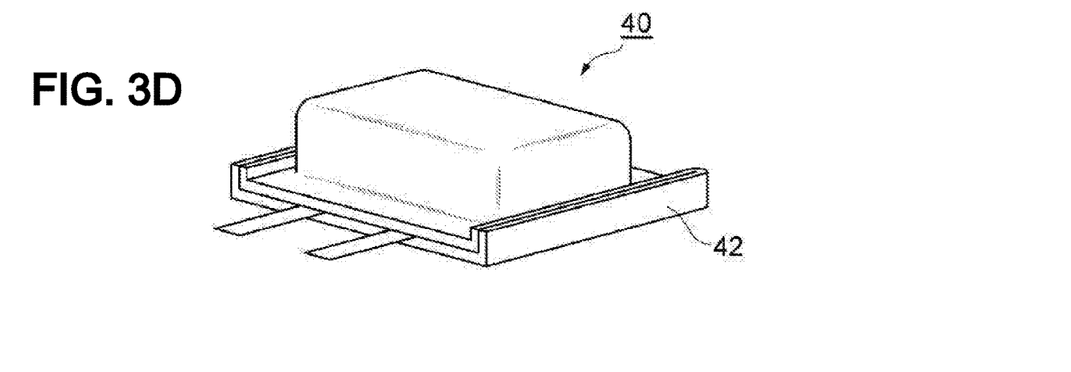

Step S23: Disposing the battery element 1 in the shaped area (recess 32) of the embossed packaging material 30, folding the embossed packaging material 30, with the surfaces being overlapped, so as to cover the recess 32 with a cover portion 34, and pressure heat-sealing one side of the embossed packaging material 30 so as to sandwich the leads 2 extending from the battery element 1 (FIG. 3B and FIG. 3C).

Step S24: Pressure heat-sealing other sides, leaving the side sandwiching the leads 2 unsealed, followed by injecting an electrolyte solution from the unsealed side and pressure heat-sealing the unsealed side in a vacuum (see FIG. 3C).

Step S25: Trimming the end portions of the pressure heat-sealed sides except for the side sandwiching the leads 2, and bending the end portions toward the shaped area (recess 32) (see FIG. 3D).

(Step S21)

At step S21, the packaging material 10, the battery element 1 including electrodes, and the leads 2 extending from the electrodes are prepared. The packaging material 10 is prepared based on the embodiment described above. The battery element 1 and the leads 2 are not particularly limited, but a known battery element 1 and known leads 2 may be used.

(Step S22)

At step S22, the recess 32 for arranging the battery element 1 is formed on the sealant layer 17 side of the packaging material 10. The recess 32 has a shape, such as a rectangular shape in plan view, conforming to the shape of the battery element 1. The recess 32 is formed by, for example, pressing a pressing member having a rectangular pressing surface against part of the packaging material 10 in the thickness direction thereof. The position to be pressed, that is, the recess 32, is formed in a position deviated to an end portion of the packaging material 10 in a longitudinal direction from the center of the packaging material 10 cut in a rectangle. Thus, the other end portion having no recess 32 is folded after forming to provide a cover (cover portion 34).

More specifically, the method of forming the recess 32 may be a method using a die (deep drawing). The molding method may be one that uses a negative die and a positive die arranged with a gap equal to or greater than the thickness of the packaging material 10 therebetween, so that the positive die is pressed into the negative die together with the packaging material 10. By adjusting pressing of the positive die, the depth (deep drawing degree) of the recess 32 can be adjusted as desired. With the recess 32 being formed in the packaging material 10, the embossed packaging material 30 is obtained. The embossed packaging material 30 has a shape, for example, as illustrated in FIGS. 2A and 2B. FIG. 2A shows a perspective view of the embossed packaging material 30, and FIG. 2B is a longitudinal cross-sectional view of the embossed packaging material 30 shown in FIG. 2A taken along the line IIb-IIb.

(Step S23)

At step S23, the battery element 1 including a cathode, a separator, an anode, and the like is arranged in the shaped area (recess 32) of the embossed packaging material 30. The leads 2 extending from the battery element 1 and respectively joined to the cathode and the anode are drawn out of the molding area (recess 32). The embossed packaging material 30 is then folded at the approximate center thereof in the longitudinal direction so that the surfaces of the sealant layer 17 are located on the inward side and overlapped with each other, followed by pressure heat-sealing the side of the embossed packaging material 30 sandwiching the leads 2. The pressure heat sealing is controlled by three conditions of temperature, pressure, and time, which are appropriately set. The pressure heat sealing is preferably performed at a temperature of not less than the temperature of fusing the sealant layer 17.

The thickness of the sealant layer 17 before being heat-sealed is preferably in the range of 40% or more to 80% or less relative to the thickness of the leads 2. With the thickness of the sealant layer 17 being not less than the lower limit, the heat-sealing resin is likely to sufficiently fill the end portions of the leads 2. With the thickness of the sealant layer 17 being not more than the upper limit, the thickness of the end portions of the packaging material 10 of the secondary battery 40 can have a moderate thickness, reducing the amount of moisture penetrating from the end portions of the packaging material 10.

(Step S24)

At step S24, the sides of the packaging material are pressure heat-sealed, leaving the side sandwiching the leads 2 unsealed. An electrolyte is then injected from the unsealed side which is then pressure heat-sealed in vacuum. The pressure heat-sealing conditions are similar to those at step S23.

(Step S25)

The end portions of the pressure heat-sealed sides except for the side sandwiching the leads 2 are trimmed and the sealant layer 17 squeezed out of the end portions is removed. The peripheral pressure heat-sealed portions are then turned up toward the shaped area 32 to form turn-up portions 42, thereby obtaining the secondary battery 40.

Preferred embodiments of the method of producing the power storage device packaging material and the method of producing the power storage device of the present invention have so far been described in detail. However, the present invention should not be construed as being limited to these specific embodiments, but may be variously modified and changed within the range of the spirit of the present invention recited in the claims.

The above embodiment has described a mode of adhering the substrate layer 11 to the barrier layer 22 using the adhesive layer 13. However, for example, the substrate layer 11 may be provided to the barrier layer 22 by coating. In this case, the material resin of the substrate layer 11 may be applied as it is to the barrier layer 22, followed by drying, or may be dissolved in a suitable solvent and then applied to the barrier layer 22, followed by drying. This means that the cover layer 21 is formed of the substrate layer 11 alone without being provided with the adhesive layer 13.

The above embodiment has described a mode of providing the anticorrosion treatment layers 15a and 15b as the barrier layer 22. Alternatively, the barrier layer 22 may have a configuration where either of the anticorrosion treatment layers 15a and 15b is omitted.

EXAMPLES

The present invention will be more specifically described below by way of Examples and Comparative Examples. The present invention should not be limited to the following Examples.

<Material>

Materials forming the packaging material for a power storage device are as follows.

(Substrate layer)

Biaxially stretched film obtained by coextruding 5 µm-thickness PET and 25 µm-thickness Ny (nylon 6)

(Adhesive Layer)

Polyurethane-based adhesive (Aluminum Foil Layer)

Examples 1 to 16 and Comparative Examples 1 to 16, Soft aluminum foil of different glossiness (40 µm-thickness Material 8079, manufactured by Toyo Aluminium K.K.).

Examples 101 to 106 and Comparative Examples 101 to 110, Soft aluminum foil of different surface roughness (40 µm-thickness Material 8079, manufactured by Toyo Aluminium K.K.). The soft aluminum foil used was one having sealant layer side surface roughness in the range of 3.4 to 5.5 µm in terms of arithmetic mean height Sa.

(Anti-Corrosion Treatment Layer)

Anti-corrosion treatment layer A: A composition was prepared as a foundation using distilled water as a solvent. The composition contained 90 mass % of "cerium oxide sol", with the solid content concentration adjusted to 10 mass %, and 10 mass % of condensed Na phosphate. On the foundation, a treatment layer made of a composition was provided. The composition was prepared using distilled water as a solvent so as to contain "polyallylamine polymer"/"glycidyl compound"=90/10, with the final solid content concentration adjusted to 5 mass %.

Anticorrosion treatment layer B: A coating type chemical conversion treatment agent (final solid content concentration of 5 mass %) was prepared as a foundation. The chemical conversion treatment agent was formulated by blending $CrF_3$ and phosphoric acid into a resin composition containing polyacrylic acid and an oxazoline group-containing acrylic resin. On the foundation, a treatment layer made of a composition was provided. The composition was prepared using distilled water as a solvent so as to contain "polyallylamine polymer"/"glycidyl compound"=90/10, with the final solid content concentration adjusted to 5 mass %.

(Sealant Adhesive Layer)

Adhesive composition for dry lamination formulated by blending 10 parts by mass (solid content) of a polyisocyanate compound into 100 parts by mass (solid content) of a maleic anhydride modified polyolefin resin dissolved in toluene (Sealant Layer)

A two-material three-layer multilayer film (80 µm thickness, manufactured by Okamoto Industries, Inc.) made up of random propylene/block propylene/random propylene <Measurement and Evaluation>

(Glossiness)

60° glossiness in TD and MD was measured for the aluminum foil layer alone and the aluminum foil layer provided with the anticorrosion treatment layer. The measurements were made by arranging a glossmeter such that the planes of incidence for the light source respectively agree with TD and MD.

(Measurement of Arithmetic Mean Height Sa)

The arithmetic mean height Sa representing surface roughness was measured using a laser microscope LEXTOL4 (manufactured by Olympus Corp.). Specifically, aluminum foil to be measured was cut into a 1 cm-square as a measurement sample, and the sample was Measured by the laser microscope LEXTOL4 using 10× objective lens and 10× eyelens.

(Compression Test)

Each of the dummy cells thus prepared was arranged between flat plates of a pressing machine. Pressure was gradually applied and the pressing was stopped at a target pressure and the pressure was kept for 3 minutes.

Evaluation of Compression Test

O: No rupture occurred from inside the battery with 2.2 MPa pressure.

X: Rupture occurred from inside the battery with 2.2 MPa pressure.

Overall Evaluation

O: Having good durability as a lithium ion battery in practical use

X: Having poor durability as a lithium ion battery in practical use

Example 1

(Production of Packaging Material for Power Storage Device)

As the aluminum foil layer 14, soft aluminum foil 8079 having a thickness of 40 μm (manufactured by Toyo Aluminium K.K.) was used, and 60° glossiness of the sealant layer side surface was measured. Values of 60° glossiness in MD and TD were 77.1 and 110.3, respectively.

Then, a base material, that is, the anticorrosion treatment layer A or B, was applied to both surfaces of the aluminum foil layer by gravure coating.

Then, the coated base material was dried, followed by baking to form an anticorrosion treatment layer. The baking was conducted in this case at 150° C. and for a treatment time of 30 seconds.

Then, a surface of the PET/Ny-coextruded biaxially stretched film for use as a substrate layer was corona-treated.

Then, a polyurethane-based adhesive was applied, as an adhesive layer, onto a surface of the anticorrosion treatment layer provided to the aluminum foil layer. Then, the aluminum foil layer was adhered to the corona-treated surface of the substrate layer via the adhesive layer by dry lamination. After that, the structure made up of the substrate layer, the adhesive layer, the anticorrosion treatment layer, the aluminum foil layer, and the anticorrosion treatment layer was left standing in an atmospheric air at 60° C. temperature for 6 days for aging treatment.

Then, an adhesive composition as a raw material for a sealant adhesive layer was applied onto a surface of the aluminum foil layer on a side opposite of the surface provided with the substrate layer. Then, the two-material three-layer multilayer film made up of random propylene/block propylene/random propylene serving as the sealant layer 17 was adhered to the aluminum foil layer via the sealant adhesive layer by dry lamination. After that, the structure made up of the substrate layer, the adhesive layer the anticorrosion treatment layer, the aluminum foil layer, the anticorrosion treatment layer, the sealant adhesive layer, and the sealant layer was left standing in an atmospheric air at 40° C. temperature for 6 days for aging treatment. A packaging material for a power storage device was thus produced.

(Production of Lithium Ion Battery Dummy Cell)

The packaging material for a power storage device was cut such that the sealing portion had a cell size of 6 mm (height)×51 mm×43 mm, and formed (the recess 32 of FIGS. 2A and 2B has the formed cell size). As the contents, aluminum foil rolled in 6 mm×51 mm×43 mm size was prepared and arranged in the formed packaging material, and sealed leaving one side unsealed. Then, 12 ml of water was injected instead of an electrolyte and the unsealed side was sealed to prepare a dummy cell.

Five of such a battery cells were prepared and a compression test was performed on them. The results of the compression test are shown in Table 1. In Table 1, "n" denotes a sample number used for the compression test.

Examples 2 to 8, Comparative Examples 1 to 8

A packaging material for a power storage device and lithium ion battery dummy cells were prepared in the same manner as in Example 1, except for using aluminum foil having differences in sealant layer side glossiness and having different anticorrosion treatment layers as shown in Table 1, and compression test was conducted. The glossiness measured herein was of the aluminum foil layer alone.

TABLE 1

| | Glossiness of Aluminum Foil Layer Alone (Sealant Layer Side) | | | Anticorrosion Treatment Layer | Compression test Result | | | | | Overall Evaluation |
|---|---|---|---|---|---|---|---|---|---|---|
| | MD | TD | Difference | | n-1 | n-2 | n-3 | n-4 | n-5 | |
| Example 1 | 77.1 | 110.3 | 33.2 | A | O | O | O | O | O | O |
| Example 2 | 77.1 | 110.3 | 33.2 | B | O | O | O | O | O | O |
| Example 3 | 94.4 | 137.9 | 43.5 | A | O | O | O | O | O | O |
| Example 4 | 94.4 | 137.9 | 43.5 | B | O | O | O | O | O | O |
| Example 5 | 667.0 | 605.6 | 61.4 | A | O | O | O | O | O | O |
| Example 6 | 667.0 | 605.6 | 61.4 | B | O | O | O | O | O | O |
| Example 7 | 690.0 | 628.0 | 62.0 | A | O | O | O | O | O | O |
| Example 8 | 690.0 | 628.0 | 62.0 | B | O | O | O | O | O | O |
| Comparative Example 1 | 695.0 | 635.0 | 60.0 | A | X | O | O | O | O | X |
| Comparative Example 2 | 695.0 | 635.0 | 60.0 | B | O | O | O | X | O | X |
| Comparative Example 3 | 743.6 | 555.0 | 188.6 | A | X | X | X | O | X | X |
| Comparative Example 4 | 743.6 | 555.0 | 188.6 | B | X | X | X | X | X | X |
| Comparative Example 5 | 743.6 | 750.0 | 6.4 | A | X | X | X | X | X | X |
| Comparative Example 6 | 743.6 | 750.0 | 6.4 | B | X | X | X | X | X | X |
| Comparative Example 7 | 674.0 | 498.0 | 176.0 | A | O | O | X | O | X | X |
| Comparative Example 8 | 674.0 | 498.0 | 176.0 | B | X | O | X | O | X | X |

As will be understood from these results, the aluminum foil layers used for preparing the lithium ion battery dummy cells each showed good results in the compression test, as an aluminum foil layer alone, when 60° glossiness was 690 or less both in MD and TD, and difference in 60° glossiness between MD and TD was 100 or less.

Examples 9 to 16 and Comparative Examples 9 to 16

A packaging material for a power storage device and lithium ion battery dummy cells were prepared in the same manner as in Example 1, except for using aluminum foil having differences in sealant layer side glossiness and having different anticorrosion treatment layers as shown in Table 2, and compression test was conducted. The glossiness measured herein was of the "aluminum foil layer provided with an anticorrosion treatment layer" at the time of forming the anticorrosion treatment layer. The aluminum foil used in Examples 9 to 16 and Comparative Examples 9 to 16 was of the same lot as the aluminum foil used in Examples 1 to 8 and Comparative Examples 1 to 8.

TABLE 2

| | Glossiness of Aluminum Foil Layer with Anticorrosion Treatment Layer (Sealant Layer Side) | | | Anticorrosion Treatment | Compression test Result | | | | | Overall |
|---|---|---|---|---|---|---|---|---|---|---|
| | MD | TD | Difference | Layer | n-1 | n-2 | n-3 | n-4 | n-5 | Evaluation |
| Example 9 | 65.5 | 93.8 | 28.2 | A | ○ | ○ | ○ | ○ | ○ | ○ |
| Example 10 | 65.5 | 93.8 | 28.2 | B | ○ | ○ | ○ | ○ | ○ | ○ |
| Example 11 | 80.2 | 117.2 | 37.0 | A | ○ | ○ | ○ | ○ | ○ | ○ |
| Example 12 | 80.2 | 117.2 | 37.0 | B | ○ | ○ | ○ | ○ | ○ | ○ |
| Example 13 | 567.0 | 514.8 | 52.2 | A | ○ | ○ | ○ | ○ | ○ | ○ |
| Example 14 | 567.0 | 514.8 | 52.2 | B | ○ | ○ | ○ | ○ | ○ | ○ |
| Example 15 | 586.5 | 533.8 | 52.7 | A | ○ | ○ | ○ | ○ | ○ | ○ |
| Example 16 | 586.5 | 533.8 | 52.7 | B | ○ | ○ | ○ | ○ | ○ | ○ |
| Comparative Example 9 | 590.8 | 539.8 | 51.0 | A | X | ○ | ○ | ○ | ○ | X |
| Comparative Example 10 | 590.8 | 539.8 | 51.0 | B | ○ | ○ | ○ | X | ○ | X |
| Comparative Example 11 | 632.1 | 471.8 | 160.3 | A | X | X | X | ○ | X | X |
| Comparative Example 12 | 632.1 | 471.8 | 160.3 | B | X | X | X | X | X | X |
| Comparative Example 13 | 632.1 | 637.5 | 5.4 | A | X | X | X | X | X | X |
| Comparative Example 14 | 632.1 | 637.5 | 5.4 | B | X | X | X | X | X | X |
| Comparative Example 15 | 572.9 | 423.3 | 149.6 | A | ○ | ○ | X | ○ | X | X |
| Comparative Example 16 | 572.9 | 423.3 | 149.6 | B | X | ○ | X | ○ | X | X |

As will be understood from these results, the aluminum foil layers used for preparing the lithium ion battery dummy cells each showed good results in the compression test, as an aluminum foil layer with the anticorrosion treatment layer, when 60° glossiness was 590 or less both in MD and TD, and difference in 60° glossiness between MD and TD was 100 or less.

Example 101

(Production of Packaging Material for Power Storage Device)

As the aluminum foil layer, soft aluminum foil 8079 having a thickness of 40 μm (manufactured by Toyo Aluminium K.K.) was used, and the arithmetic mean height Sa of the sealant layer side surface was measured. The sealant layer side surface roughness was 5.5 μm in terms of the arithmetic mean height Sa.

A packaging material for a power storage device was prepared in the same manner as in Example 1 for the procedure after that.

(Production of Lithium Ion Battery Dummy Cell)

A packaging material for a power storage device was prepared in the same manner as in Example 1.

Five of such a battery cell were prepared and compression test was performed for them. The results of the compression test are shown in Table 3. In Table 3, "n" denotes a sample number used for the compression test.

Examples 102 to 106

A packaging material for a power storage device and lithium ion battery dummy cells were prepared in the same manner as in Example 101, except for using aluminum foil having differences in the arithmetic mean height Sa representing surface roughness and having different anticorrosion treatment layers as shown in Table 3, and compression test was conducted. The glossiness measured herein was of the aluminum foil layer alone.

TABLE 3

| | Surface Roughness Sa | Anticorrosion Treatment | Compression test Result | | | | |
|---|---|---|---|---|---|---|---|
| | (μm) | Layer | n-1 | n-2 | n-3 | n-4 | n-5 |
| Example 101 | 5.5 | A | ○ | ○ | ○ | ○ | ○ |
| Example 102 | 5.5 | B | ○ | ○ | ○ | ○ | ○ |
| Example 103 | 4.8 | A | ○ | ○ | ○ | ○ | ○ |
| Example 104 | 4.8 | B | ○ | ○ | ○ | ○ | ○ |
| Example 105 | 4.6 | A | ○ | ○ | ○ | ○ | ○ |
| Example 106 | 4.6 | B | ○ | ○ | ○ | ○ | ○ |
| Comparative Example 101 | 4.5 | A | ○ | ○ | ○ | X | ○ |
| Comparative Example 102 | 4.5 | B | X | ○ | ○ | ○ | ○ |
| Comparative Example 103 | 4.2 | A | X | X | ○ | ○ | ○ |
| Comparative Example 104 | 4.2 | B | ○ | X | X | ○ | ○ |
| Comparative Example 105 | 3.8 | A | X | X | X | X | X |
| Comparative Example 106 | 3.8 | B | X | X | X | X | X |
| Comparative Example 107 | 3.6 | A | X | X | X | X | X |
| Comparative Example 108 | 3.6 | B | X | X | X | X | X |

TABLE 3-continued

| | Surface Roughness Sa (μm) | Anticorrosion Treatment Layer | Compression test Result | | | | |
|---|---|---|---|---|---|---|---|
| | | | n-1 | n-2 | n-3 | n-4 | n-5 |
| Comparative Example 109 | 3.4 | A | X | X | X | X | X |
| Comparative Example 110 | 3.4 | B | X | X | X | X | X |

As will be understood from these results, the aluminum foil layers used for preparing the lithium ion battery dummy cells each showed good results in the compression test, as an aluminum foil layer alone, when the arithmetic mean height Sa representing surface roughness was 4.6 μm or more.

Comparative Examples 101 to 110

A packaging material for a power storage device and lithium ion battery dummy cells were prepared in the same manner as in Example 1, except for using aluminum foil having differences in sealant layer side glossiness and having different anticorrosion treatment layers as shown in Table 3, and compression test was conducted. The arithmetic mean height Sa representing surface roughness measured herein was of the "aluminum foil layer provided with an anticorrosion treatment layer" at the time of forming the anticorrosion treatment layer. The aluminum foil used in Comparative Examples 1011 to 110 was of the same lot as the aluminum foil used in Examples 101 to 106.

As will be understood from these results, the aluminum foil layers used for preparing the lithium ion battery dummy cells each showed poor results of the compression test, as an aluminum foil layer with an anticorrosion treatment layer, when the arithmetic mean height Sa representing surface roughness was less than 4.6 μm.

REFERENCE SIGNS LIST

1 . . . Battery element; 2 . . . Lead; 10 . . . Packaging material (packaging material for power storage device); 11 . . . Substrate layer; 13 . . . Adhesive layer; 14 . . . Aluminum foil layer; 15a, 15b . . . Anticorrosion treatment layer; 16 . . . Sealant adhesive layer; 17 . . . Sealant layer; 30 . . . Embossed packaging material; 32 . . . Shaped area (recess); 34 . . . Cover portion; 40 . . . Secondary battery

What is claimed is:

1. A packaging material for a power storage device, comprising:
a structure made up a cover layer, a barrier layer, a sealant adhesive layer, and a sealant layer laminated in this general order, wherein the sealant layer is configured to be a layer, which is innermost to the power storage device;
wherein the barrier layer includes an aluminum foil layer and an anticorrosion treatment layer that is provided to a sealant-layer-side surface of the aluminum foil layer and directly physically contacts the sealant adhesive layer;
wherein the aluminum foil layer in a state of being provided with the anticorrosion treatment layer has a 60° glossiness that is 590 or less in both MD, which is a direction of extrusion, and TD, which is a direction vertical to MD; and
wherein the aluminum foil layer in a state of being provided with the anticorrosion treatment layer has a difference in 60° glossiness between MD and TD that is 55 or less.

2. The packaging material for a power storage device of claim 1, wherein:
the aluminum foil layer in a state of being provided with the anticorrosion treatment layer has a 60° glossiness that is 120 or less in both MD and TD; and
the aluminum foil layer in a state of being provided with the anticorrosion treatment layer has a difference in 60° glossiness between MD and TD that is 40 or less.

3. A packaged power storage device, comprising:
(A) a power storage device comprising battery elements including electrodes; leads extending from the respective electrodes; and (B) a container holding the power storage device,
wherein the container is formed from the packaging material of claim 1 so that the sealant layer is a layer of the packaging material, which is innermost to the power storage device.

4. The packaging material for a power storage device of claim 1, comprising:
wherein the sealant-layer-side surface has a surface roughness in a range of 4.6 μm or more to 10.0 μm or less in terms of arithmetic mean height Sa wherein the sealant-layer-side of the aluminum foil layer is a surface of the aluminum foil layer configured to face the power storage device.

5. A packaged power storage device, comprising:
(A) a power storage device comprising battery elements including electrodes; leads extending from the respective electrodes; and (B) a container holding the power storage device,
wherein the container is formed from the packaging material of claim 4 so that the sealant layer is a layer of the packaging material, which is innermost to the power storage device.

6. The packaging material of claim 1, wherein the cover layer consists of a substrate layer and an adhesive layer, which is in direct physical contact with each of the substrate layer and the barrier layer.

7. The packaging material of claim 4, wherein the anticorrosion treatment layer comprises a cerium oxide sol containing cerium oxide particles having a mean size of 100 nm or less and wherein a thickness of the anticorrosion treatment layer is 20 nm to 500 nm.

8. The packaging material of claim 7, wherein the sealant adhesive layer comprises an acid modified polyolefin-based resin and a thickness of the sealant adhesive layer is from 20 μm to 40 μm.

9. The packaging material of claim 4, wherein the anticorrosion treatment layer comprises a blend of phosphoric acid and a chromium compound into a resin binder and wherein a thickness of the anticorrosion treatment layer is 20 nm to 500 nm.

10. The packaging material of claim 9, wherein the sealant adhesive layer comprises an acid modified polyolefin-based resin and a thickness of the sealant adhesive layer is from 20 μm to 40 μm.

* * * * *